United States Patent [19]
Mills

[11] 3,943,786
[45] Mar. 16, 1976

[54] PHOTOGRAPHIC FILM PROCESSING APPARATUS HAVING DISENGAGEMENT MEANS

[75] Inventor: Loring K. Mills, Hampton, N.H.

[73] Assignee: Polaroid Corporation, Cambridge, Mass.

[22] Filed: May 2, 1974

[21] Appl. No.: 466,400

[52] U.S. Cl. ....... 74/384; 74/405
[51] Int. Cl.$^2$ ....... F16H 35/00; F16H 57/00
[58] Field of Search ....... 354/86; 74/405, 384

[56] References Cited

UNITED STATES PATENTS

| | | | |
|---|---|---|---|
| 2,392,071 | 1/1946 | Terrett et al. | 74/405 X |
| 2,854,855 | 10/1958 | Dudley | 74/405 |
| 2,906,184 | 9/1959 | Hennig et al. | 74/405 X |
| 3,753,392 | 8/1973 | Land | 354/86 |

*Primary Examiner*—Leonard H. Gerin
*Attorney, Agent, or Firm*—Alfred E. Corrigan

[57] ABSTRACT

A film advancing-fluid spreading apparatus for progressively distributing a released mass of a processing composition across an exposed photosensitive layer of a film unit carrying a pod wherein the processing composition is contained. A pair of pressure-applying members having juxtaposed surfaces are rotatably mounted for contacting and advancing upper and lower surfaces of the film unit therebetween to distribute a layer of the processing composition across the photosensitive layer of the film unit. One of the pair of pressure-applying members includes a pinion axially coupled thereto which receives energy from a motor connected to a power transmitting system including a coupler whereby energy is transferred from the motor to rotate the pinion in a predetermined direction. The coupler permits a transfer of energy through the power transmitting system to the pinion when the film advancingfluid spreading apparatus is operating in a driving mcde, and substantially prevents the transfer of energy from the pinion back through the power transmitting system to the motor when the pressure-applying member having the pinion axially coupled thereto is manually rotated in the predetermined direction.

13 Claims, 4 Drawing Figures

PHOTOGRAPHIC FILM PROCESSING APPARATUS HAVING DISENGAGEMENT MEANS

REFERENCE TO RELATED APPLICATIONS

This application is related to copending application Ser. No. 466,399 filed on even date herewith in the names of Andrew S. Ivester and Bruce K. Johnson and entitled Photographic Film Processing Apparatus Having A Protective Device.

BACKGROUND OF THE INVENTION

1. Field of the Invention

This invention relates to photography and, more particularly to an improved film advancing-fluid spreading apparatus for use with cameras of the self-developing type.

2. Description of the Prior Art

The prior art is replete with fluid-spreading apparatus for use with cameras of a self-developing type. A variety of forms of photographic apparatus has been proposed wherein each film unit included in an assemblage of a succession of individual photographic film units is moved, following exposure, between a pair of pressure-applying members for releasing a processing composition carried by the film units and distributes the processing composition within the film unit. Movement of successive photographic film units between the pressure-applying members is effected by manually pulling or drawing each film unit aided by a leader or similar element attached thereto. The film unit is advanced by positioning the pressure-applying members such that they function to receive a portion of the film unit therebetween whereupon the portion of the film unit is grasped and manually withdrawn between the pressure-applying members towards the exterior of the camera. While being essentially satisfactory, the apparatus necessitates a camera structure complicated by an inclusion of a requisite means for storing and manipulating a plurality of leaders such that each leader is made available on the exterior of the camera. A disadvantage inherent in this class of fluid spreading apparatus is a requirement that the photographic film unit be withdrawn from the camera between the pressure-applying members at a uniform rate and in a straight line whereby the processing composition is uniformly dispersed across a photosensitive layer of the assemblage. Failure to do so often results in an uneven spreading of the processing composition whereby portions of the exposed photosensitive layer not contacted thereby will remain undeveloped.

Another class of fluid spreading apparatus includes means for engaging the film unit near its trailing end and advancing the assemblage into the bite of a pair of non-rotating pressure-applying members as shown in U.S. Pat. Nos. 2,477,324 and 2,873,658. The major drawback with apparatus of the type set forth in these two patents is that the film unit used in U.S. Pat. No. 2,477,324 must be substantially rigid or thick in order to withstand pressures exerted thereon in moving the assemblage into the bite of the pressure-applying members, while the film unit in U.S. Pat. No. 2,873,658 must be substantially rigid or thick in order to enable the film unit to drive the pressure-applying members as the film unit is moving therebetween. Increasing the thickness and/or rigidity of the assemblage adds to material and manufacturing costs and in a case of increased thickness subtracts from compactness of a cassette wherein the assemblage of film units is retained and the camera wherein the cassette is adapted for use.

An advancement in fluid spreading apparatus has been introduced wherein the film unit is advanced and processed subsequent to exposure by a motorized system. The system automatically, upon receiving a signal that the film unit has been exposed within a camera, advances the exposed film unit into the bite of a pair of pressure-applying members adapted to receive the film unit and continues its movement at a uniform rate toward the camera's exterior while spreading a processing composition between elements of the film unit as shown in U.S. Pat. No. 3,776,118. A motor included in the system is connected by a gear train to one of the pair of pressure-applying members, thereby imparting rotary motion in a predetermined direction thereto and serves to advance the film unit between the pair of pressure-applying members to provide the film unit with complete coverage of the processing composition during a processing cycle. While serving to eliminate some of the undesirable features of the aforementioned fluid spreading apparatus, the sytem does not provide a convenient method for manually rotating the pressure-applying members whereby remnant deposits of the processing composition may be removed therefrom, or more importantly, for manually withdrawing the film unit between the pressure-applying members to complete the processing cycle which may have been interrupted by a malfunction of the motorized system whereby the film unit lies arrested between the pressure-applying members in a partially processed state. Manual rotation of the pressure-applying member may present an excessive loading condition to each member of the system including the motor due to the necessity to overcome a mechanical advantage provided in the system's design which becomes a mechanical disadvantage when energy is transmitted back through the system which could lead to extensive damage thereto.

From the foregoing, it can be seen that there is a need for a drive system for a fluid spreading apparatus having at least one rotatable pressure-applying member. wherein energy may be transmitted to the pressure-applying member to rotate it in a predetermined direction but which substantially prevents energy from being transmitted by rotation of the pressure-applying member back through the drive system.

SUMMARY OF THE INVENTION

The invention relates to a photographic apparatus and, more particularly, to a film advancing-fluid spreading apparatus for use with a film assemblage of the type described in U.S. Pat. No. 3,779,770.

The film assemblage described in the aforementioned patent includes a film cassette of unitary construction including spaced forward and rear walls, a pair of side walls and leading and trailing end walls which cooperate to enclose a plurality of thin, flexible, film units of the type more fully described in U.S. Pat. No. 3,415,644. The film cassette's forward wall is provided with a rectangular exposure aperture which is generally coextensive with the area of the film unit to be exposed and at least one elongated slot which extends rearwardly along one lateral side of the forward wall and at least part way down the cassette's trailing end wall. One end of the cassette is provided with an elongated exit slot through which film units may be moved, one at a time, i.e., the slot has a depth only slightly greater than the thickness of one film unit and less than the combined thickness of two film units, as more fully described in the aforementioned U.S. Pat. No. 3,779,770. A resilient platen is positioned between the stack of film units and a battery located adjacent the cassette's rear wall. The platen is provided to urge a foremost film unit against the forward wall such that its photosensitive layer is located in position for exposure and the leading edge or edge of the film unit is in alignment with the exit slot.

The film assemblage is adapted to be located within a camera in position for exposure of the foremost film unit. Mounted within the camera is a film advancing apparatus including a film engaging member which is adapted to extend into the slot in the cassette's forward and trailing end walls and engage the foremost film unit at or near its trailing end or at its trailing edge prior to moving it through the exit slot in the cassette and into the bite of a pair of pressure-applying members mounted adjacent a leading end of the foremost film unit. The pressure-applying members are adapted to receive the film unit as it moves out of the exposure position through the exit slot and drive the film unit toward the exterior of the camera while simultaneously spreading a processing composition between layers of the film unit.

The camera is provided with a motor powered by the battery included within the cassette and operates in a driving mode to transmit power through a power transmitting system having one end coupled to the motor and an opposite end adapted to be coupled to a pinion axially coupled to one of the pressure-applying members thereby providing continuous movement of the exposed film unit from the exposure position within the cassette to a position between the pressure-applying members and the exterior of the camera. The power transmitting system includes a coupler positioned whereby energy is transferred from the motor to the pinion for rotating one of the pressure-applying members in a predetermined direction and prevents transmission of power back through the power transmitting system to the motor when the motor and the power transmitting system are no longer operating in the driving mode and an attempt is made to drive the system by manually rotating the pinion in the predetermined direction. The rotating pressure-applying members continue the uninterrupted movement of the film unit toward the exterior of the camera while simultaneously rupturing a pod containing the processing composition located near the leading end of the film unit and spreading the processing composition between photosensitive and image-receiving layers of the film unit to initiate formation of a visible image within the film unit as is well known in the art. After the processing composition has been spread between the photosensitive and image-receiving layers, the film unit is moved to the exterior of the camera out of the bite of the pressure-applying members where the user may grasp the film unit and after a predetermined period of time view the positive image of the scene photographed.

In a preferred embodiment, one of the components of the film advancing-fluid spreading apparatus, i.e., the pressure-applying members, may be manually operated should a malfunction develop in the motor or in the power transmitting system. The pressure-applying members are preferably pregapped to provide for initially spacing the pressure-applying members apart such that the film-engaging member may advance the foremost film unit into a position wherein a leading end portion of the film unit is between the pressure-applying members. The separation of the pressure-applying members provided by the pregapping is substantially less than the film unit's thickness such that the pressure-applying members adjust by further increasing the separation to accommodate the film unit when received therebetween and subsequently return to the pregapped position upon the passing of the film unit. Manual rotation of the pressure-applying members may be performed when the motor is rendered inoperative and out of the driving mode by rotating the pressure-applying member having the pinion attached thereto in the predetermined direction of by grasping the leading end portion of the film unit and pulling the film unit between the pressure-applying members whereby rotation of the pressure-applying members will continue to advance the film unit toward the exterior of the camera while simultaneously spreading the fluid processing agent between photosensitive and image-receiving layers of the film unit.

The coupler, included in the power transmitting system, disengages the power transmitting system from the pinion when the pressure-applying member is manually rotated in the predetermined direction whereby the pinion is free to rotate about its own axis thereby preventing damage to the power transmitting system and to the motor.

The power transmitting system is designed to provide a unidirectional drive to the pinion with each member thereof having a specific relationship to each adjoining member included in the system. Therefore, careful consideration must be given during construction thereof to a factor known to those skilled in the art as a mechanical advantage which theoretically represents the ratio of a force exerted by a member to the force acting upon the member. When the power transmitting system is inoperative, an attempt to reverse the driving mode from the pinion back through the power transmitting system to the motor operates at a mechanical disadvantage thereby subjecting the members included in such transmission to a requisite load which may exceed a permissible load established therefor in determining endurance strengths of each of the members and result in substantial damage to one or all of the members. The coupler provides the film advancing apparatus with a device which isolates the pinion whereby forces acting against manual rotation of the pinion are disengaged therefrom and the film unit can be conveniently withdrawn from the camera between the pressure-applying members; or, the pressure-applying members can be conveniently rotated and foreign substances removed therefrom without undue thought or activity.

Accordingly, an object of the present invention is to provide a photographic apparatus including a film advancing-fluid spreading apparatus, a motor, a power transmitting system coupled to the motor operating in a driving mode to advance a film unit, subsequent to exposure, leading edge first into the bite of a pair of juxtaposed pressure-applying members whereby the film unit is processed and moved from an exposure position into a second position exterior to the camera, and a coupler included in the power transmitting system operating to transfer energy through the power transmitting system to a driver coupled to one of the pressure-applying members for rotating the pressure-applying member in a predetermined direction and substantially prevents a transfer of energy from the pressure-applying member back through the power transmitting system into the motor when the pressure-applying member is rotated in the predetermined direction.

It is yet another object of the present invention to provide a film advancing-fluid spreading apparatus which upon manual rotation of one of a pair of pressure-applying members in the predetermined direction automatically isolates the pressure-applying members from a power transmitting system used to transfer energy from a motor to the pressure-applying member when the motor is operating in a driving mode, whereby the pressure-applying members may be manually rotated to remove foreign substances therefrom, or a malfunction in the power transmitting system or the motor renders the system inoperative and a film unit is arrested between the pressure-applying members in a partially processed state, the film unit may be manually withdrawn therefrom by grasping a protruding edge of the film unit and pulling the film unit until the film unit is clear of the pressure-applying members thereby driving the said one pressure-applying member in the predetermined direction to complete the process without damaging the power transmitting system or the motor.

Other objects of the invention will in part be obvious and will in part appear hereinafter.

The invention accordingly comprises the apparatus possessing the construction, combination of elements, and arrangements of parts which are exemplified in the following disclosure and the scope of the application which will be indicated in the claims.

BRIEF DESCRIPTION OF THE DRAWINGS

For a fuller understanding of the nature and objects of the invention, reference should be made to the following detailed description taken in conjunction with the accompanying drawings wherein.

DETAILED DESCRIPTION OF THE INVENTION

A photographic apparatus including the present invention finds particular utility in the treatment of photographic film assemblages of the type including all materials required to produce a finished photographic print. The film assemblage includes a photosensitive image-recording layer adapted to be exposed to produce an image; a second, or image-receiving element adapted to be superposed with the photosensitive layer, at least during processing to aid in distributing a viscous processing composition in contact with the exposed photosensitive layer, and a rupturable container or rupturable pod including a viscous processing composition adapted, when distributed in contact with the exposed photosensitive layer, to produce a positive image. Film assemblages of this type may take a number of different forms including, for example, separate photosensitive and second sheets adapted to produce a single print or a plurality of prints; or individual film units each including a pair of layers of sheets coupled with or secured to one another in face-to-face relationship and adapted to be exposed and processed to produce a single print. The viscous processing composition is supplied in the rupturable pod coupled with one or both layers and adapted to be moved together with the superposed layers through a passage between a pair of pregapped juxtaposed pressure-applying members; or the processing composition may be supplied from a source not associated with the superposed layers and dispensed between the elements for subsequent spreading in a thin layer during movement of the elements between the pressure-applying members. Each film assemblage or film unit is adapted to be processed by advancing the film unit, rupturable pod foremost, between the pressure-applying members for dispensing its contents in response to the application of compressive pressure to the rupturable pod. Accordingly, the film unit is designed to be advanced from the photographic apparatus into the light immediately after the viscous processing composition is distributed within the film unit, which indicates that spreading of the processing composition must be complete and effective to prevent further exposure of the photosensitive elements almost immediately as the spreading occurs.

Figure 1:
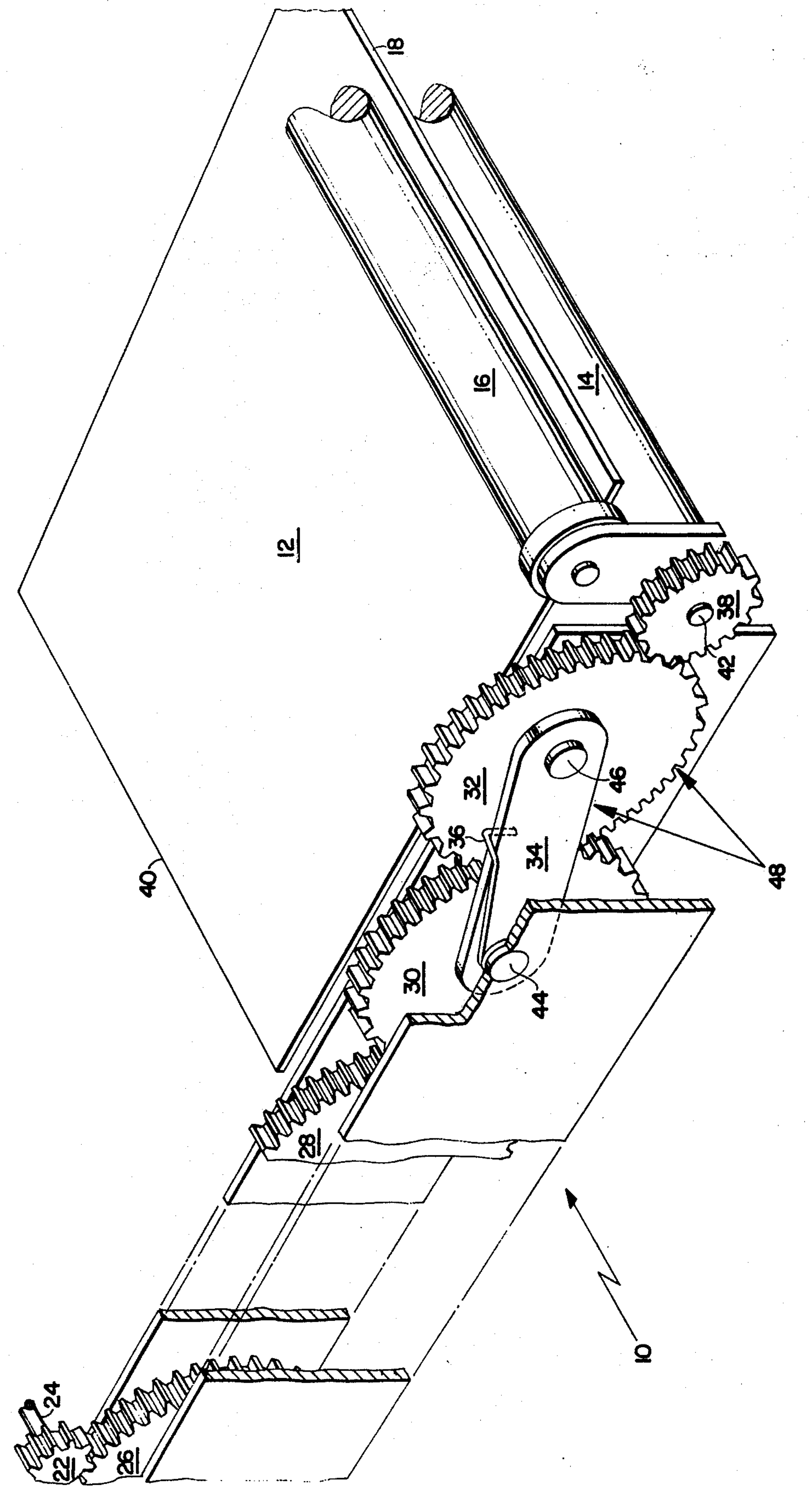
FIG. 1 is an enlarged perspective view of a film advancing-fluid spreading apparatus shown having a power transmitting system partly in section, and a pair of pressure-applying members operatively coupled thereto operating in a motorized driving mode.
Figure 2:
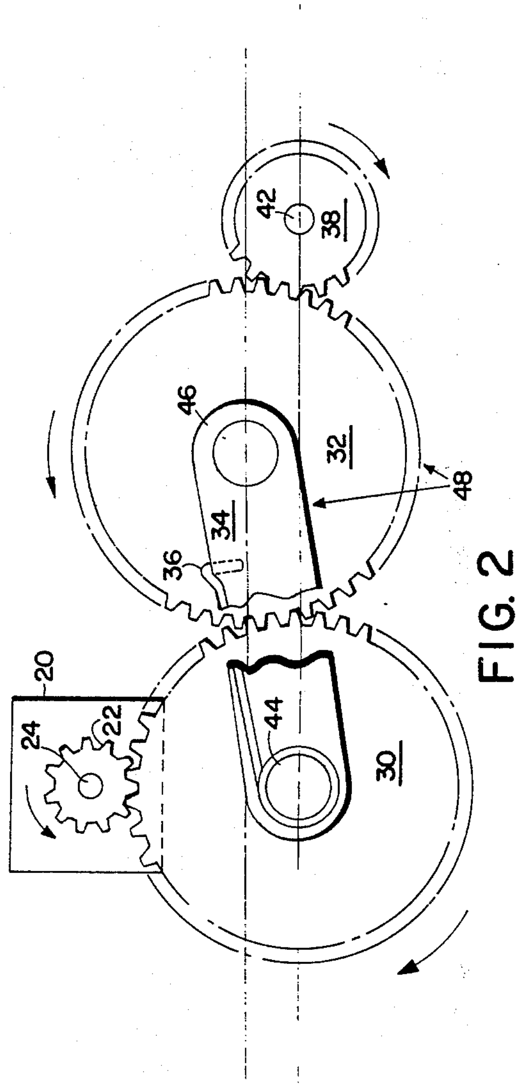
FIG. 2 is a schematic view of a coupling device of the instant invention shown in a coupled position as illustrated in FIG. 1.

Referring in more detail by reference characters to FIGS. 1 and 2, the present invention is designed to be incorporated into a compact self-developing photographic apparatus such as a camera, which in many respects generally conforms to camera structure disclosed and described in considerable detail in U.S. Pat. No. 3,714,879. In the form of the camera described in the above-mentioned patent, the present invention may be adapted for use therewith and comprises a film advancing-fluid spreading apparatus 10 for use in moving film unit 12 between lower and upper pressure-applying members 14 and 16, respectively, to spread the viscous processing composition by advancing a leading end 18 of the film unit 12 into the bite of the pressure-applying members 14 and 16 and driving the lower pressure-applying member 14 in a predetermined direction whereby upper pressure-applying member 16 rotates in an opposite direction in frictional engagement with the film unit 12. The lower pressure-applying member 14 preferably receives power for rotation thereof from an electric motor 20 receiving energy from an energy source such as a suitable battery or a plurality of suitable batteries (not shown); a power transmitting system comprising a coupler device 48 and which includes at an input end driving pinion 22 coupled to a shaft 24 of the motor 20, gears 26 and 28, and at an output end thereof gear 30. When the apparatus 10 is operating in a driving mode, wherein the film unit 12 is advanced into the bite of pressure-applying members 14 and 16, the coupler device 48 comprising link 34, resilient member 36, and coupler gear 32 is in mesh with pressure member pinion 38 whereby energy received from the motor 20 via the power transmitting system is transmitted to rotate the lower pressure-applying member 14 in the predetermined direction when the fluid advancing-fluid spreading apparatus 10 is operating in the driving mode.

The film advancing-fluid spreading apparatus 10 is constructed to deliver rotary motion in a predetermined direction and uniform angular velocity to the pressure member pinion 38 and provides a unidirectional mechanical advantage whereby minimal input energy received from the energy source by the motor 20 is capable of delivering sufficient power to drive the power transmitting system, coupler gear 32, and the pressure member pinion 38 thereby advancing the film unit 12 at a rate which assures complete distribution of the processing composition upon the exposed photosensitive layer of the film unit 12. Therefore, the motor 20 is dependent upon power input from the battery sufficient to provide for advancement of the film unit 12 between the pressure-applying members 14 and 16 at a substantially constant predetermined speed subsequent to exposure of the film unit's photosensitive layer and to advance the film unit 12 from an exposure position within a cassette, into the bite of pressure-applying members 14 and 16.

The lower pressure-applying member 14 constitutes a driving member for the pair of pressure-applying members 14 and 16 in that it includes the pressure member pinion 38 axially coupled thereto which in turn is coupled to the motor 20 through the power transmitting system. Pressure-applying members 14 and 16 are adapted to progressively advance the film unit 12 between the pressure-applying members 14 and 16, whereby a compressive force exerted thereon by the pressure-applying members 14 and 16 first effects a rupturing of the rupturable pod (not shown) containing the viscous processing composition and then serve to progressively distribute a released mass of the processing composition across the exposed photosensitive layer of the film unit 12 as the film unit progressively passes therebetween.

Subsequent to exposure, the motor 20 operating in the driving mode supplies energy to the power transmitting system which is transferred by the coupler device 48 to the pressure member pinion 38 whereby the pressure-applying member 14 is rotated in the predetermined direction (as viewed schematically in FIG. 2). The motor 20 supplies rotary motion to shaft 24 having driving pinion 22 axially connected thereto whereby gear members of the power transmitting system 26, 28 and 30 are set into rotation causing the coupler gear 32 of the coupler device 48 to rotate in a counter direction to the pressure member pinion 38 in mesh therewith. It is important to note the power transmitting system may consist of any number of gears or rolling surfaces necessary to transmit power from the motor 20 to the pressure member pinion 38. The major consideration is the rate and direction of rotation of pressure member pinion 38 which must be driven in the predetermined direction at a rate sufficient to advance the film unit 12 between pressure-applying members 14 and 16 to assure that the processing composition is spread completely across the exposed photosensitive layer of the film unit 12. A further requisite is for the pressure member pinion's rotational axis 42 and rotational axis 44 of gear 30 to be located in a plane which does not contain the rotational axis 46 of the coupler gear 32 whereby link 34 axially coupled to axes 44 and 46 is permitted to pivot about axis 44 and gear 30 in a manner explained in detail in the following paragraphs.

The camera includes a mechanism (not shown) which operates automatically to engage a rear edge 40 of the exposed film unit 12 and advance it from within the cassette into the bite of the rotating pressure-applying member 14 and pressure-applying member 16 whereby the film unit 12 is advanced therebetween to the exterior of the camera whereat it may be grasped by the user.

Figure 3:
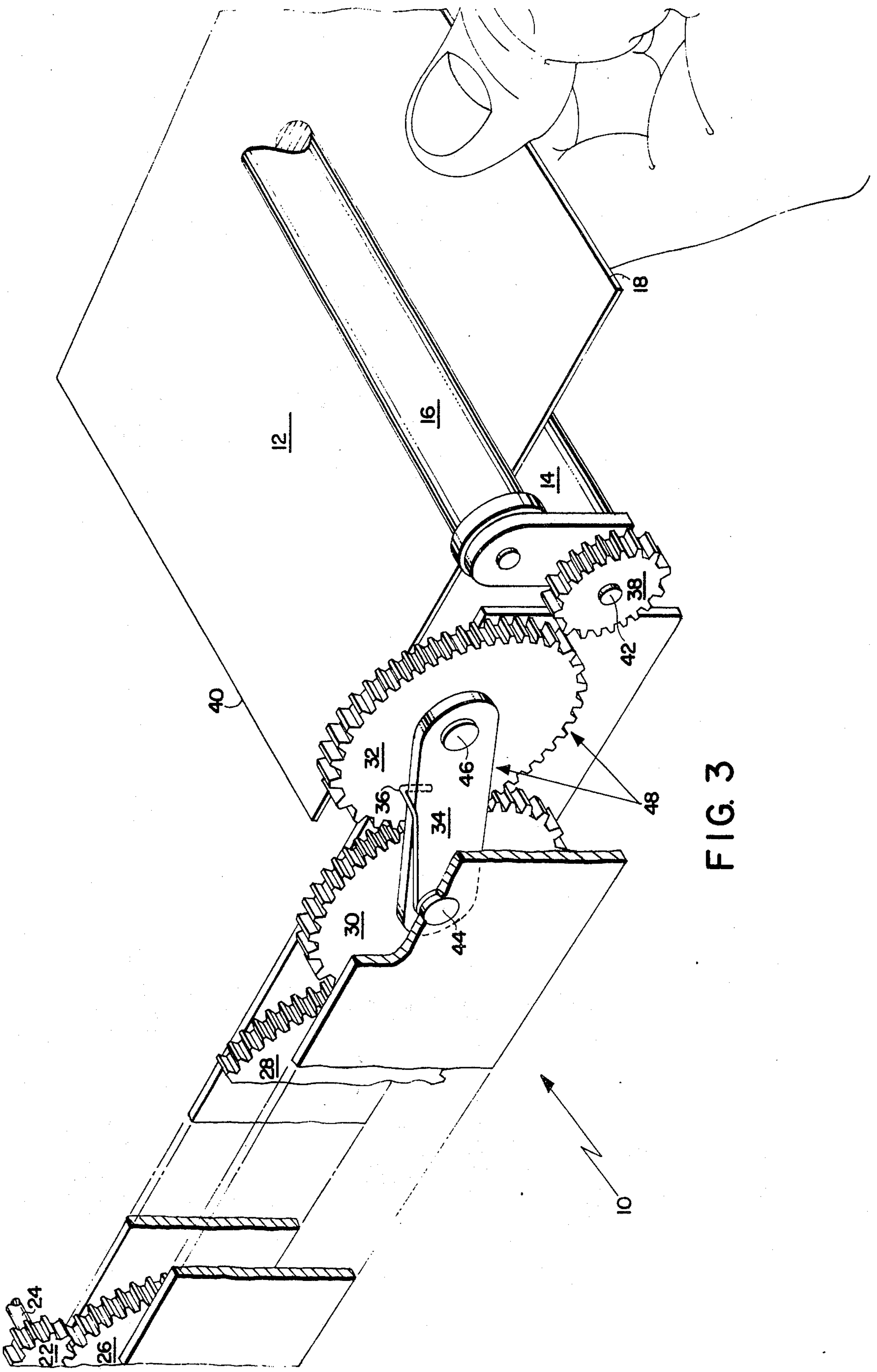
FIG. 3 is an enlarged perspective view of the film advancing-fluid spreading apparatus shown having an inoperative power transmitting system, partly in section, and a coupler operatively uncoupling the power transmitting system from the pair of pressure-applying members.

Continuous operation of the power transmitting system is a necessity during a processing cycle wherein the exposed film unit 12 is advanced between the pressure-applying members 14 and 16 and the viscous processing composition is distributed across the exposed photosensitive layer of the film unit 12. Should the film advancing-fluid spreading apparatus 10 fail to continue operating during the processing cycle due to one of a number of possible reasons, e.g., a malfunction whereby the motor 20 fails to continue operating in the driving mode, or the energy source, the battery, fails to continue to supply sufficient power to the motor 20 to complete the processing cycle; it is possible for a film unit 12 to be arrested between the bite of the pressure-applying members 14 and 16 in a partially processed state (as shown in FIG. 3). Failure to move the film unit 12 subsequent to such a stoppage would result in a loss of the exposed scene recorded thereon. In order to complete the processing cycle, the film unit 12 must be manually withdrawn between the pressure-applying members 14 and 16 by grasping a leading edge 18 thereof and pulling the film unit 12 therefrom whereby the pressure member pinion 38 is forced to perform at a mechanical disadvantage in order to reverse the driving mode from an energy receiving pressure member pinion 38 to an energy suplying motor 20. Other probable danger areas to consider if the apparatus 10 were driven in a reverse direction, i.e., from the pressure member pinion 38 to the motor 20, would include overcoming built-in losses due to inaccuracies in forming and spacing gear teeth, inertia included in the power transmitting system, and friction losses and mechanical drag included in the motor 20 when at rest and inoperative. To reverse the driving mode from the pressure member pinion 38 to the motor 20 would substantially amplify dynamic loading of many of the components of the film advancing-fluid spreading apparatus 10 during advancement of the film unit 12 and possibly load the system beyond such a system's design load despite a generous safety factor which may have been included for each component, and thereby subject the components to substantial damage, extensive repair and render the film advancing-fluid spreading apparatus 10 completely inoperative.

Figure 4:
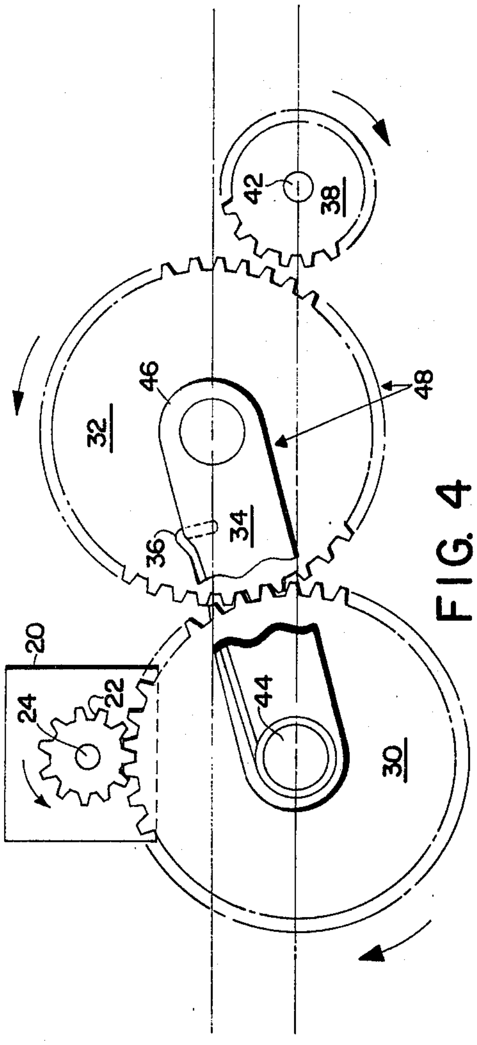
FIG. 4 is a schematic view of the coupling device of the instant invention shown in an uncoupled position as illustrated in FIG. 3.

Accordingly, the present invention operates to permit a transfer of energy from the motor 20 to the pressure member pinion 38 and to substantially prevent the transfer of energy from the pressure member pinion 38 back to the motor 20 as can be seen in FIGS. 3 and 4. The arrangement of the rotational axes 42, 44 and 46 of pinion 38, gear 30 and coupler gear 32, and a vertical component of a peripheral force transmitted to coupler gear 32 during manual rotation of the pressure member pinion 38 in the predetermined direction, cooperate with the link 34, axially coupled to coupler gear 32 and gear 30, to urge coupler gear 32 and link 34 to pivot counterclockwise about axis 44 and thereby disengage coupler gear 32 from pressure member pinion 38 to prevent the transfer of rotational energy therefrom. The link 34 additionally provides a take-up feature which maintains a proper axial center-to-center distance between the axis 44 of gear 30 and axis 46 of the coupler gear 32 thereby assuring that the center relationship of the axis 46 of coupler gear 32 is maintained during pivotal movement of the disengagement link 34 and coupler gear 32 about axis 44 of gear 30 during the disengagement of coupler gear 32 from pressure member pinion 38. The resilient member 36, having one end thereof coupled to ground and an opposite end coupled to the link 34, restricts the counterclockwise pivotal movement of link 34 and coupler gear 32 from a first position, wherein the coupler gear 32 is in mesh with gear 30 and pressure member pinion 38 (as shown in FIGS. 1 and 2) to a second position wherein coupler gear 32 is pivoted about axis 44 away from and disengaged from pressure member pinion 38 (as shown in FIGS. 3 and 4). When the coupler gear 32 and the link 34 have pivotally moved into the second position, the resilient member 36 tends to urge the coupler gear 32 and link 34 back into the first position whereupon continued rotation of the lower pressure-applying member 14 in the predetermined direction pivots the coupler gear 32 and the link 34 about axis 44 between the first and second positions until the processing cycle has been completed and the rear edge 40 of the film unit 12 has passed between pressure-applying members 14 and 16. Although gears have been shown as means for transmitting energy from the motor 20 to the pressure member pinion 38, it should be obvious that other suitable rolling surfaces such as clutches and friction wheels may be used for the same purpose. Also, motor 20 may be battery operated, manually cranked or spring operated to drive the power transmitting system in the driving mode.

It should be obvious to one skilled in the art that although the power transmitting system including the coupler device 48 has been described as operatively coupled to the lower pressure-applying member 14, that the upper pressure-applying member 16 may be adapted to be operatively coupled to the power transmitting system for rotation thereof in an opposite predetermined direction to advance the film unit 12. The pressure member pinion's rotational axis 42 and the rotational axis 44 of gear 30 in mesh with the coupler gear 32 would once again be located in a plane which does not contain the rotational axis 46 of the coupler gear 32 and would be displaced in a direction opposite to that previously described whereby the coupler 32 and the link 34, axially coupled thereto, would be pivotally moved about axis 44 during manual rotation of the pressure member pinion 38 thereby disengaging coupler gear 32 from pressure member pinion 38 and preventing the transfer of energy therefrom through the power transmitting system to the motor.

This invention may be practiced or embodied in still other ways without departing from the spirit and essential character thereof. The specific and preferred embodiments described herein are therefore to be considered illustrative and not restrictive, the scope of the invention being indicated by the appended claims and all variations which come within the meaning of the claims are intended to be embraced therein.

What is claimed is:

1. Photographic apparatus comprising:

a pair of juxtaposed pressure-applying members including at least one roller adapted to be driven in a predetermined direction for spreading a processing composition across an exposed area of a photosensitive element while simultaneously advancing the element therebetween;

means attached to said one roller for driving said one roller in said predetermined direction;

means for supplying power for rotating said drive means;

means coupled to said power supplying means for transmitting power, received from said power supplying means at an input end thereof, to an output end; and means for coupling said output end of said power transmitting means to said drive means, said coupling means being mounted for automatic movement between a first position, wherein power received at said output end is transmitted to said drive means for rotation of said roller in said predetermined direction and a second position wherein said coupling means substantially prevents the transfer of power from said drive means to said output end of said power transmitting means during manual rotation of said roller in said predetermined direction.

2. Photographic apparatus as defined in claim 1 wherein said coupling means includes a pair of rotatably supported members.

3. Photographic apparatus as defined in claim 2 wherein said power transmitting means and said drive means comprise a plurality of gears.

4. Photographic apparatus as defined in claim 3 wherein said coupling means includes at least one gear.

5. Photographic apparatus as defined in claim 4 wherein said coupling means further includes a link having a first end pivotally attached to said output end of said power transmitting means and a second end coupled to said one gear for enabling said coupling means to move from said first position into said second position during manual rotation of said roller in said predetermined direction.

6. Photographic apparatus as defined in claim 5 wherein said coupling means further includes biasing means attached to said link for urging said coupling means out of said second position into said first position.

7. Photographic apparatus including a film advancing-fluid spreading apparatus for spreading a processing composition across an exposed area of a photosensitive element and a power transmitting system coupled to a motor for operating said film advancing-fluid spreading apparatus, comprising:

a pair of juxtaposed pressure-applying members including at least one roller mounted to be rotated in a predetermined direction for advancing the exposed photosensitive element between said pressure-applying members while distributing the processing composition across the element;

a motor;

a gear train including a first gear coupled to said motor;

a second gear coupled to said roller for driving said roller in said predetermined direction;

an intermediate gear rotatably mounted for enmeshment with said first and second gears; and means for disengaging said intermediate gear from said second gear during manual rotation of said roller in said predetermined direction, said disengaging means having a first end pivotally connected to an axis of rotation of said intermediate gear and a second end rotatably mounted about an axis of rotation of said first gear for automatic pivotal movement of said intermediate gear about said first gear's axis from a first position wherein said intermediate gear is in mesh with said first and second gears and said motor is driving said second gear to a second position wherein said intermediate gear is out of mesh with said second gear during manual rotation of said roller in said predetermined direction.

8. Photographic apparatus as defined in claim 7 wherein said disengagement means further includes biasing means for urging said intermediate gear out of said second position into said first position.

9. Photographic apparatus as defined in claim 8 wherein said biasing means includes spring means for restricting angular rotation of said disengagement means about said axis of said first gear.

10. Photographic apparatus as defined in claim 7 wherein said axes of said first, second and intermediate gears are arranged such that peripheral forces transferred to said intermediate gear by said first and second gears are in a direction which tends to maintain sasid intermediate gear in said first position when said first gear is set in motion by said motor and to move said intermediate gear into said second position when said second gear is rotated by said roller during manual rotation of said roller in said predetermined direction.

11. Photographic apparatus as defined in claim 7 wherein said disengagement means includes means for pivotally connecting it to said intermediate and first gears such that peripheral forces generated by manual rotation of said roller and said second gear in said predetermined direction are not transferred by said intermediate gear to said first gear and said motor.

12. Photographic apparatus as defined in claim 11 wherein said disengagement means further includes means for securely maintaining a center distance between said first gear and said intermediate gear when said intermediate gear is in said first and second position.

13. Photographic apparatus as defined in claim 7 wherein said first, second and intermediate gears are rotatably mounted such that an axis of rotation of said second gear is in the same plane as said axis of rotation of said first gear and said axis of rotation of said intermediate gear is spaced outside of said plane containing the rotational axes of said first and second gears for enabling said intermediate gear to pivotally move about said rotational axis of said first gear between said first and second positions.

* * * * *